Oct. 18, 1955
C. S. FOREMAN
2,720,893
TEMPORARY EXPANSION PLUG FOR PIPE LINES AND THE LIKE
Filed April 10, 1952
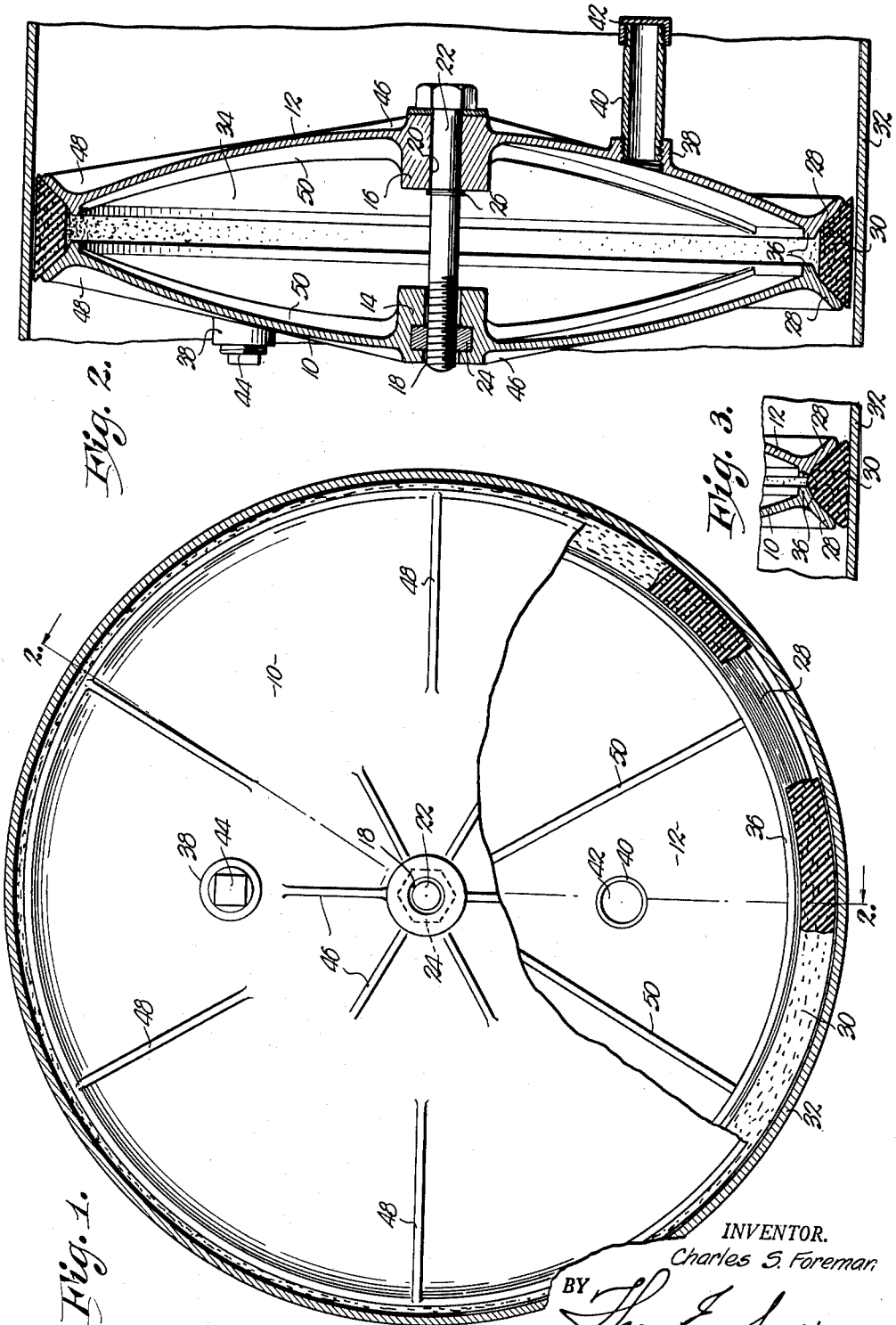
INVENTOR.
Charles S. Foreman
BY
Thos. E. Scofield
ATTORNEY.

United States Patent Office 2,720,893
Patented Oct. 18, 1955

2,720,893

TEMPORARY EXPANSION PLUG FOR PIPE LINES AND THE LIKE

Charles S. Foreman, Hickman Mills, Mo., assignor to Cleaner Pipelines Company, North Kansas City, Mo., a partnership Application April 10, 1952, Serial No. 281,564

2 Claims. (Cl. 138—89)

The present invention relates in general to temporary closures for open-ended pipes or pipe lines, and it deals more particularly with an expansion plug of improved construction.

Good practice in the construction of pipe lines requires the open end of the line to be plugged or "night-capped" at the close of each working day to keep out rain, snow, animals, dirt and foreign objects which might otherwise be thrown into the open end by mischievous passers-by while the construction crew is away. Similar considerations make it desirable to close both ends of the conductor casings customarily layed under highways and railroad tracks ahead of the pipe line construction gang; in this case, of course, the closures should be left in place until time for the pipe line to be laid through the casing, which may be a matter of days or even weeks later.

Plugs or night caps have been proposed in the past to meet the foregoing situation, but for various reasons have enjoyed little popularity and less use. Instead, it is common at the end of the working day to put over the open end of the pipe line any kind of covering that may be handy—a piece of canvas, a gunny sack, a piece of sheet iron tack-welded to the pipe, etc. These obviously are not watertight, and the canvas or sack may even be blown away by a gust of wind. Construction water entering the pipe carries dirt which settles out and becomes caked on the interior of the line, so is very difficult to remove; in winter the water freezes, presenting even more of a problem.

With the foregoing considerations in mind, the object of the present invention, broadly speaking, is to provide an improved expansion plug for temporarily closing and effectively sealing the open end of a pipe; more specifically, it is my aim to provide a plug of this character which is economical to construct, sturdy and durable so as to make feasible its widespread adoption by pipe line contractors—and which is so light in weight, easily handled, simple and trouble-free in operation as to encourage its unfailing use by the personnel of the construction crew.

Another object is to provide a plug having the foregoing advantages and which is suitable for use by repair crews engaged in the repair of ruptured gas lines to seal the gas in the line against possible ignition by the cutting and welding torches employed in repairing the break.

Other and further objects of the invention, together with features of novelty whereby the objects are achieved, will appear in the course of the following description.

In the accompanying drawings which form a part of the specification and are to be read in conjunction therewith, and in which like reference numerals are employed to indicate like parts of the various views:

Fig. 1 is an elevational view of my improved pipe plug, parts having been broken away for purposes of illustration, Fig. 2 is a cross-sectional view taken along the line 2—2 of Fig. 1 in the direction of the arrows, the sealing gasket ring being shown in its normal unexpanded condition, and Fig. 3 is a fragmentary sectional detail similar to Fig. 2 but showing the gasket ring expanded outwardly into sealing engagement with the interior of the pipe line.

Referring more particularly to the drawings, my expansion plug employs a pair of substantially identical concavo-convex disks 10 and 12 having their concave faces confronting one another as illustrated in Fig. 2. The disks are thickened at their centers to form bosses 14 and 16 which in turn contain centrally located, axially aligned bores 18 and 20. A hexagonal-headed bolt 22 rotatably received in the latter bore has its end screwthreadedly connected to disk 10, conveniently by means of an internally-threaded nut 24 cast in the boss 14 as shown. A snap ring 26 seated in an annular groove on the shank of the bolt bears lightly against the inner face of the boss 16, serving as a keeper to maintain the bolt associated with disk 12 in the event the bolt is completely unscrewed from nut 24 and also serving to exert an axial thrust on boss 16 to assist in separating the two disks as the bolt is unscrewed.

Each of the disks has around its margin an integral out-turned flange or lip 28 of substantially frusto-conical shape, the two flanges together forming an annular groove or channel which is generally V-shaped in radial cross section. Received in this groove is a gasket ring 30 of rubber or like elastic material. In its normal undeformed or unstressed condition, this gasket ring is of isoceles-trapazoidal cross section (see Fig. 2) and its outside diameter is slightly smaller than the inside diameter of the pipe 32 whose open end is to be sealed by the plug. However, by turning bolt 22 in a direction to draw the two disks toward one another, flanges 28 are caused to act as wedges expanding the ring radially outward into sealing engagement with the inside wall of the pipe as illustrated in Fig. 3. At the same time, of course, the gasket ring seals the margin of the cavity 34 between the concave faces of the two disks.

At the juncture of flange 28 with the margin of the concavo-convex section of each disk, there is an axially projecting annular bead or shoulder 36 underlying the gasket ring and resisting any tendency on the part of the gasket material to flow radially inward as the flanges advance toward one another. These beads also serve as stops to prevent over-tightening of the bolt 22, and thus guard against injury which might otherwise occur to the gasket ring as the result of such over-tightening.

Each of the disks has, offset from its center, an internally threaded nipple 38 communicating with the chamber 34 between the two disks. A short pipe 40 screwed into one of these and closed at its outer end by a cap 42 serves as a handle by which the workman may hold the plug as he advances it into the open end of the pipe line 32 and turns bolt 22 with a wrench to expand the gasket ring, as explained hereinbefore. The other nipple ordinarily is sealed with a conventional screw-in closure plug 44.

As will be clear from the drawings, each of the two flanged disks is a unitary casting, and preferably is made of relatively light metal. The lightness and compactness of the finished assembly, taken together with the provision of the offset handle 40, makes the unit very easy to hold and manipulate. Even though the walls of the concavo-convex section are made quite thin for the sake of lightness and ease of handling, their disked shape inherently gives them strength and rigidity which is further enhanced by the strengthening effect of the out-turned marginal flanges 28. Particularly when the disks are of large diameter for use with large pipe lines, it is desirable also to reinforce them by providing integral radial ribs internally and/or externally as shown at 46, 48 and 50.

If for any reason it is desired to bleed gas or inflammable vapor from a pipe line whose end is to be closed by my expansion plug, this can of course be accomplished very easily by merely removing the cap 42 and closure 44 before the plug is inserted into the line and expanded. When this is done, the gas or vapor obviously can enter chamber 34 through the open nipple in disk 10 and flow outwardly from the chamber through pipe 40. Thus, in repairing a ruptured pipe line which contains inflammable gas, the plug may be interposed in the line just ahead of the rupture to isolate same from the gas-containing region; then, by attaching an extension pipe onto the end of pipe 40, the gas may be bled off at a point remote from that at which the workmen are using cutting and welding torches in the repair of the rupture, so that the danger of explosion is eliminated.

From the foregoing, it will be seen that this invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as various modifications of the invention may be made without departing from the scope thereof, it is to be understood that all matter herein set forth or shown in the accompanying drawings is to be interpreted as illustrative and not in a limiting sense.

Having thus described my invention, I claim:

1. In a temporary plug for the open end of a pipe line, a pair of concavo-convex disks having their concave faces confronting one another, each of said disks having around its margin an integral annular flange of substantially frusto-conical shape, the respective flanges diverging from one another toward their rims, a ring of elastic rubber-like gasket material between the flanges and supported thereon for engagement with the interior of a pipe line, a bolt extending through the center of one of said disks and having its end screw-threadedly connected to the other disk at the center thereof for drawing said disks together and thereby causing said flanges to expand said elastic ring radially outward, means connecting said bolt to said one disk to prevent axial movement relative thereto whereby said disks are separated by said bolt upon turning the bolt in the direction opposite to that for drawing the disks together, the space between said disks comprising a chamber sealed around its margin by said ring, one of said disks having a hollow handle projecting outwardly from the convex side thereof, the handle being offset from the center of the disk and the interior of the handle communicating with said chamber, said handle having an opening at its outer end with a removable closure for such opening, the other disk containing an aperture communicating with said chamber, and a removable closure for said aperture.

2. In a temporary plug for the open end of a pipe line, a pair of concavo-convex disks having their concave faces confronting one another, each of said disks having around its margin an integral annular flange of substantially frusto-conical shape, the respective flanges diverging from one another toward their rims, a ring of elastic rubber-like gasket material between the flanges and supported thereon for engagement with the interior of a pipe line, a bolt rotatably journaled in the center of one of said disks, means connecting said bolt with said one disk to prevent longitudinal movement of the bolt with respect thereto, the end of said bolt being screw-threadedly connected to the other disk at the center thereof for drawing said disks together and thereby causing said flanges to expand said elastic ring radially outward and for separating said disks to relieve said expansion.

References Cited in the file of this patent

UNITED STATES PATENTS

| 112,029 | Gates | Feb. 21, 1871 |
| 147,929 | Gaines | Feb. 24, 1874 |
| 821,876 | Lauth | May 29, 1906 |
| 986,297 | Kinkade | Mar. 7, 1911 |
| 1,077,352 | Kemp et al. | Nov. 4, 1913 |
| 1,837,346 | Thomas et al. | Dec. 22, 1931 |
| 2,512,041 | Steele | June 20, 1950 |

FOREIGN PATENTS

| 606,503 | Germany | Dec. 4, 1934 |